(12) United States Patent
Matsuura et al.

(10) Patent No.: US 7,170,614 B1
(45) Date of Patent: Jan. 30, 2007

(54) IMAGE FORMING APPARATUS

(75) Inventors: Tsumoru Matsuura, Machida (JP); Yasushi Yamade, Yokohama (JP)

(73) Assignee: Minolta Co., Ltd., Osaka (JP)

( * ) Notice: Subject to any disclaimer, the term of this patent is extended or adjusted under 35 U.S.C. 154(b) by 456 days.

(21) Appl. No.: 09/437,499

(22) Filed: Nov. 10, 1999

(30) Foreign Application Priority Data

Nov. 13, 1998 (JP) .................. 10-323715

(51) Int. Cl.
*G06F 15/00* (2006.01)
*G06K 15/00* (2006.01)

(52) U.S. Cl. ..................... 358/1.12; 358/1.18

(58) Field of Classification Search ............. 358/1.1, 358/1.5, 1.12, 1.13, 1.14, 1.15, 296, 1.18; 355/46, 71; 399/401
See application file for complete search history.

(56) References Cited

U.S. PATENT DOCUMENTS

| | | | | |
|---|---|---|---|---|
| 5,126,786 A | * | 6/1992 | Tanaka | 355/46 |
| 5,236,185 A | * | 8/1993 | Taneda | 270/53 |
| 5,822,075 A | * | 10/1998 | Kaneko et al. | 358/296 |
| 5,852,764 A | * | 12/1998 | Kida et al. | 399/401 |
| 5,865,434 A | | 2/1999 | Yamanaka | |
| 5,918,101 A | | 6/1999 | Kuroyanagi | |
| 5,921,537 A | * | 7/1999 | Matsui et al. | 270/1.03 |
| 5,940,582 A | * | 8/1999 | Akabori et al. | 358/1.13 |
| 6,452,607 B1 | * | 9/2002 | Livingston | 715/705 |

FOREIGN PATENT DOCUMENTS

| | | |
|---|---|---|
| JP | 60-044464 | 3/1985 |
| JP | 62-246742 | 10/1987 |
| JP | 62-251178 | 10/1987 |
| JP | 06-062202 | 3/1994 |
| JP | 07-230370 | 8/1995 |
| JP | 09272659 | 10/1997 |

* cited by examiner

*Primary Examiner*—Gabriel I. Garcia
(74) *Attorney, Agent, or Firm*—McDermott Will & Emery LLP

(57) ABSTRACT

A printer is disclosed which automatically unifies the layout of output to each of mail bins. This printer sets the layout for each of the discharged paper trays (mail bins). The information of layout designated by a personal computer is invalidated when the layout has been set for the mail bins designated by an external personal computer. By storing in a memory the image data edited in the layout to be produced when the supply of papers has run out, the printer permits effective use of the memory and a reduction in the time of output.

18 Claims, 15 Drawing Sheets

(A)

(B)

IMAGE FORMING APPARATUS

This application is based on application No. 10-323715 filed in Japan, the content of which is hereby incorporated by reference.

BACKGROUND OF THE INVENTION

1. Field of the Invention

This invention relates to an image forming apparatus such as a printer for forming an image on a sheet-like thing.

2. Description of the Related Art

A prior printer with a plurality of discharge openings (including optional devices), more often than not, has been using the discharged openings as mail bins for allocating them to specific persons or addresses. Users of the printer can attain easy fulfillment of communications and notices by directing output prints to mail bins assigned to certain persons.

If a nonspecific plurality of users printout sheet-like things into a certain mail bin, this mail bin is eventually contained papers resulting from various layout processing (such as, for example, paper size, Nin1, double-side printing, enlargement/contraction, stapling, perforation, and folding). The owners of the mail bin, therefore, have encountered the problem of finding difficulty in managing and orderly arranging the output prints.

SUMMARY OF THE INVENTION

It is an object of this invention to provide an image forming apparatus which is capable of automatically unifying the layouts of prints to be discharged into the individual mail bins.

This invention facilitates the management and orderly arrangement of the discharged prints because it permits automatic unification of the layouts processing of the prints discharged into the discharge tray.

Particularly, when the apparatus is provided with a plurality of the discharged trays, since the layouts are unified for each of the destinations of discharge, the owners using the individual discharged trays for mail bins are enabled to enjoy a markedly improved convenience.

If an already edited image data is memorized in a memory and the stock of the sheet-like things happens to run out, it not only allows effective use of the memory because an before edited image data and an information of edition do not need to be respectively preserved but also aids in decreasing the printout time because no edition is required to be made anew on the printout which follows the replenishment of the sheet-like things.

DESCRIPTION OF THE PREFERRED EMBODIMENT

The preferred embodiments of this invention will be described below with reference to the drawings annexed hereto.

First Embodiment

Figure 1:
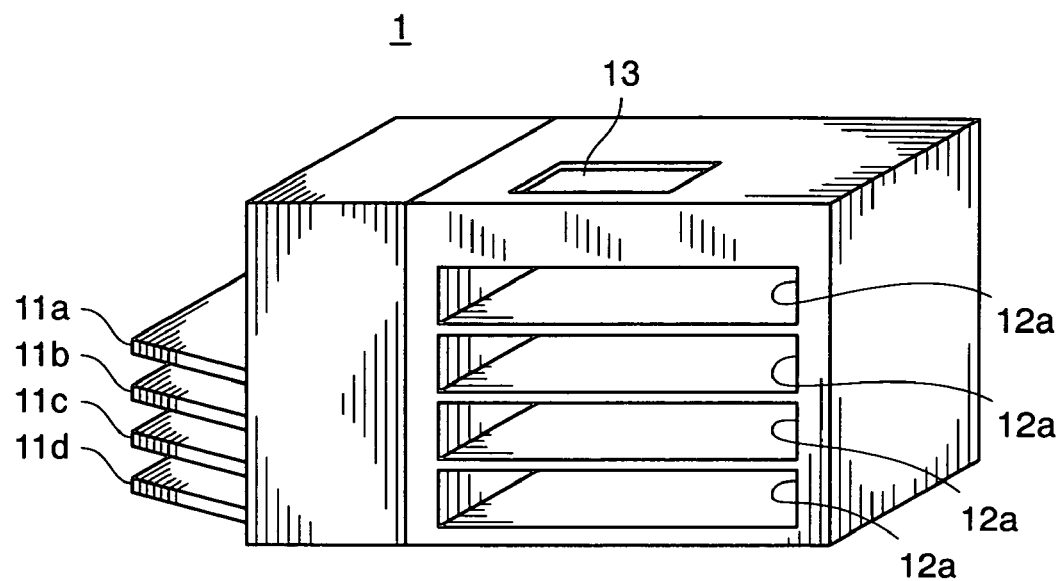
FIG. 1 is a schematic perspective view of a printer according to the invention.

Refer to FIG. 1, this printer 1 is set with four paper discharge openings, which are provided respectively with paper discharge trays 11a, 11b, 11c and lid into which papers carrying a formed image are discharged. The each paper discharge trays 11 are previously allocated to certain persons or addresses and are used as so-called mail bins. This printer 1 is set with four paper feeding openings 12a, 12b, 12c, and 12d and allows arbitrary selection of the size of the papers used for printing from among four paper sizes (such as, for example, A4, A5, B4 and B5). The printer 1 is provided with an operating display 13 on the upper surface thereof. The user is enabled by means of the operating display 13 to set freely the layout of printed papers discharged into each of the discharged paper trays 11 for each destinations of discharged papers.

Figure 2:
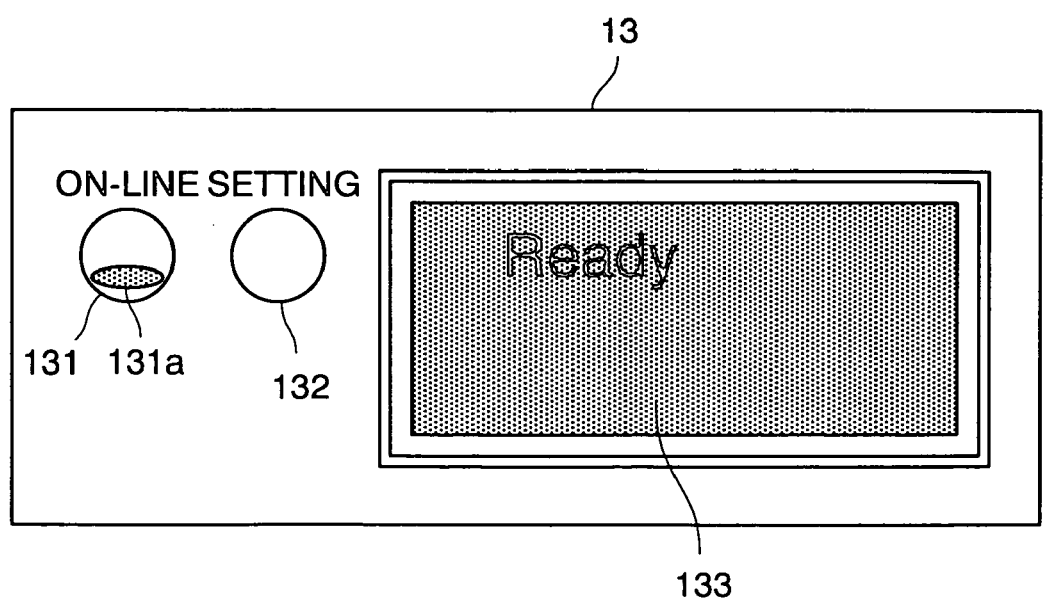
FIG. 2 is a plan view of an operating display shown in FIG. 1.

Refer to FIG. 2, the operating display 13 is provided with an on-line key 131, a setting key 132 and a touch panel type liquid crystal display 133. The on-line key 131 turns on or off the state of connection with an external device such as a personal computer. The setting key 132 starts a mode of the layout setting of each destination of discharged papers. The liquid crystal display 133 is used in the layout setting by the user.

The on-line key 131 switches the status of continuity between the on-line (the state of connection to an external device) and the off-line (the state of absence of connection to an external device) in response to each depression given thereto. An indicator 131a (for example: LED etc.) of the on-line key 131 is lit up at the start of the on-line cycle and lit off at the start of the off-line cycle.

The layout setting is effected on each discharged printed paper by the use of the setting key 132 and the display 133. The layout comprises to Nin1 processing, double-side printing, paper size setting, margin setting, stapling, perforation, folding, sorting, water marking, printing of serial numbers, impression of printing time, and decision of enlargement or contraction.

The Nin1 processing is to print N pages of image on one sheet of paper. The double-side printing is to print on both sides of each sheet of paper. The perforation is to form filing holes in each bundle of printed papers along one lateral edge thereof. The folding is to effect a double fold or a Z-shaped triple fold in printed papers. The sorting is to decide whether or not the directions of discharge of printed papers grouped as documents (or parts) are alternated or whether or not the printed papers sorted as documents (or parts) are discharged as staggered in the direction perpendicular to the direction of paper discharge. The water marking is to mark such as "secret" and "copying strictly inhibited" which are added to printed matter.

Of these items of the layout setting, the Nin1, double-side printing, and size of paper will be described specifically herein below. The present invention brings the effects thereof similarly with respect to the other items than these three items.

Figure 3:
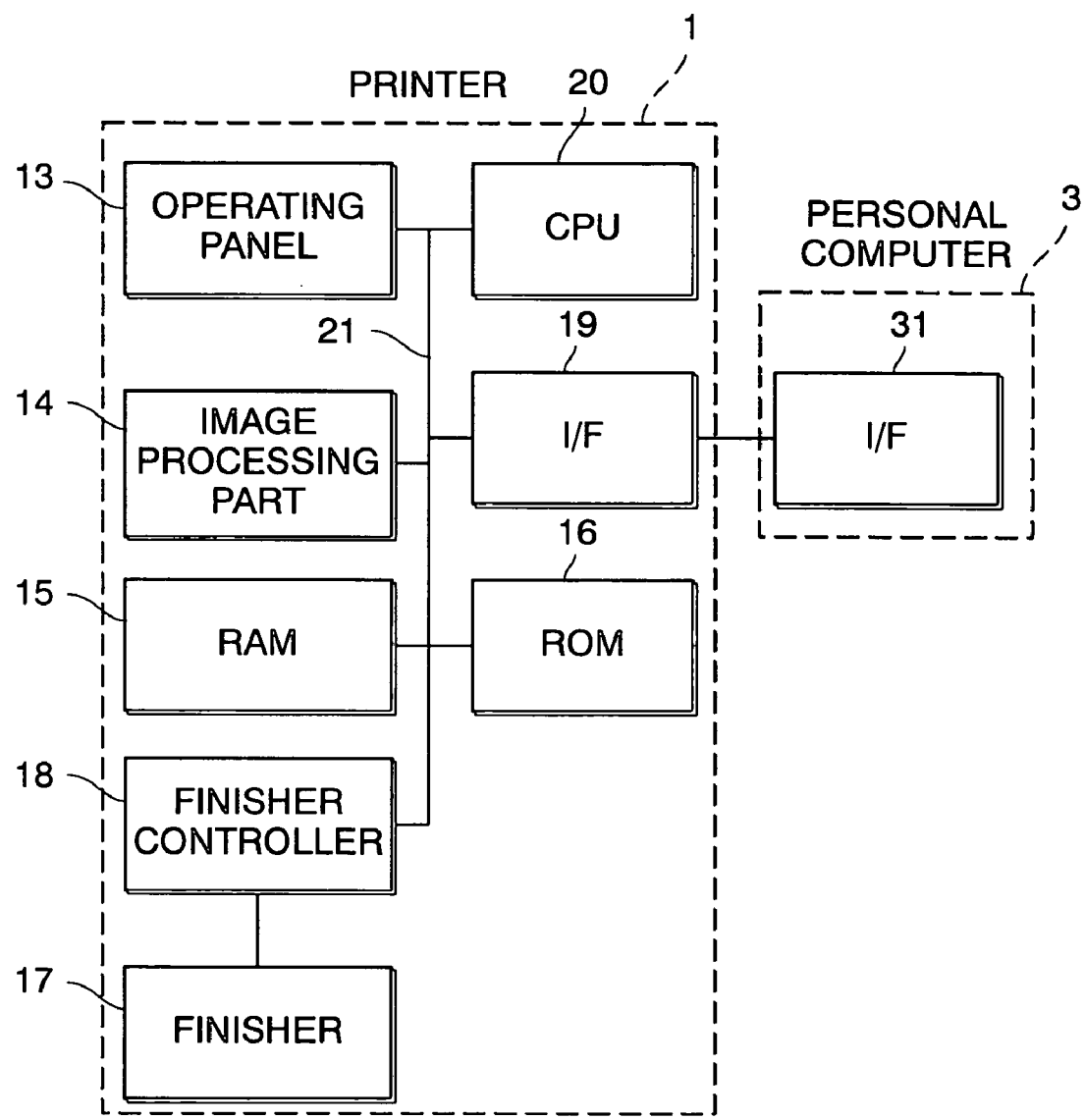
FIG. 3 is a block diagram illustrating a typical embodiment of a system using the printer shown in FIG. 1.
Figure 4:
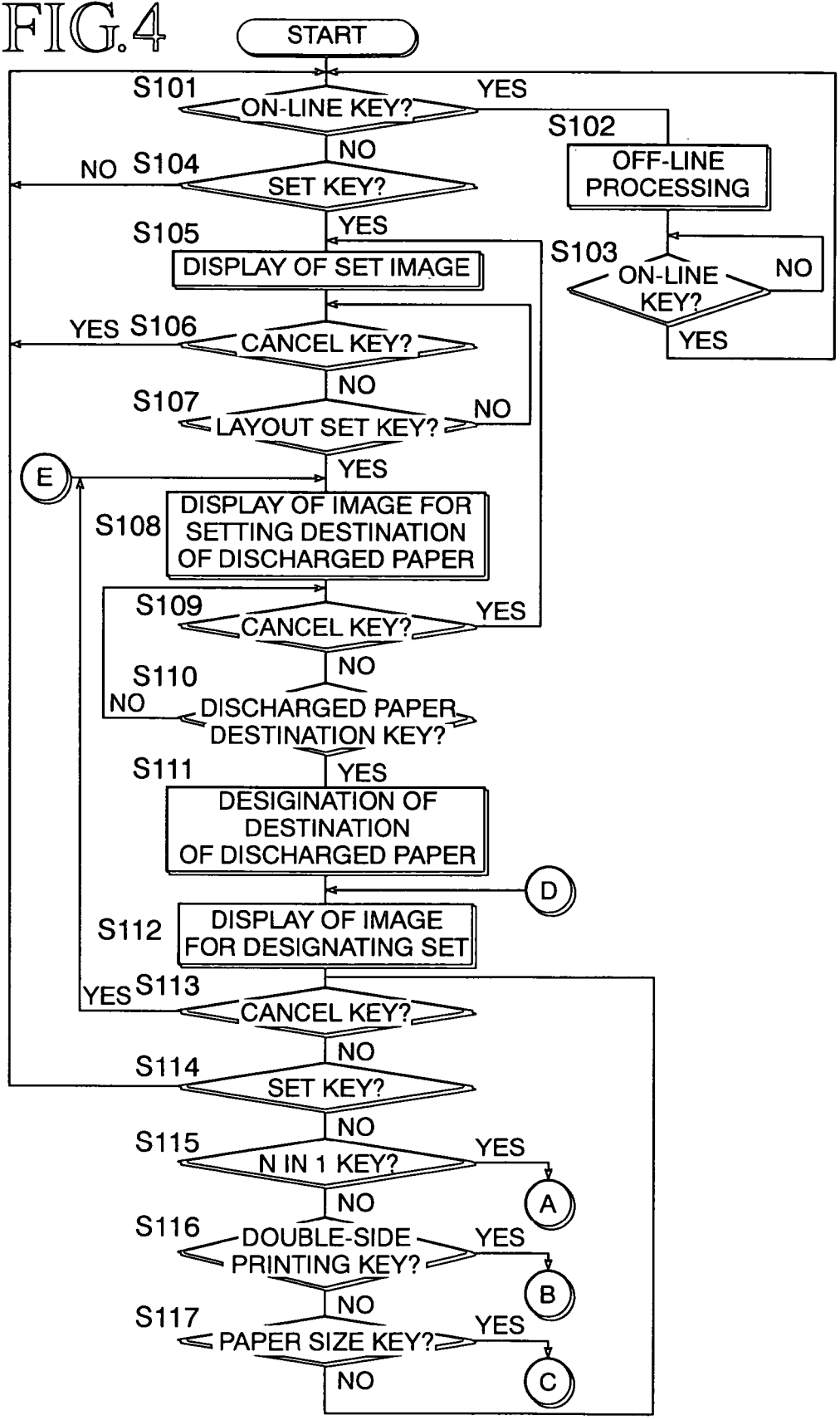
FIG. 4 is a flow chart of the system showing the processing for the user's layout setting.
Figure 5:
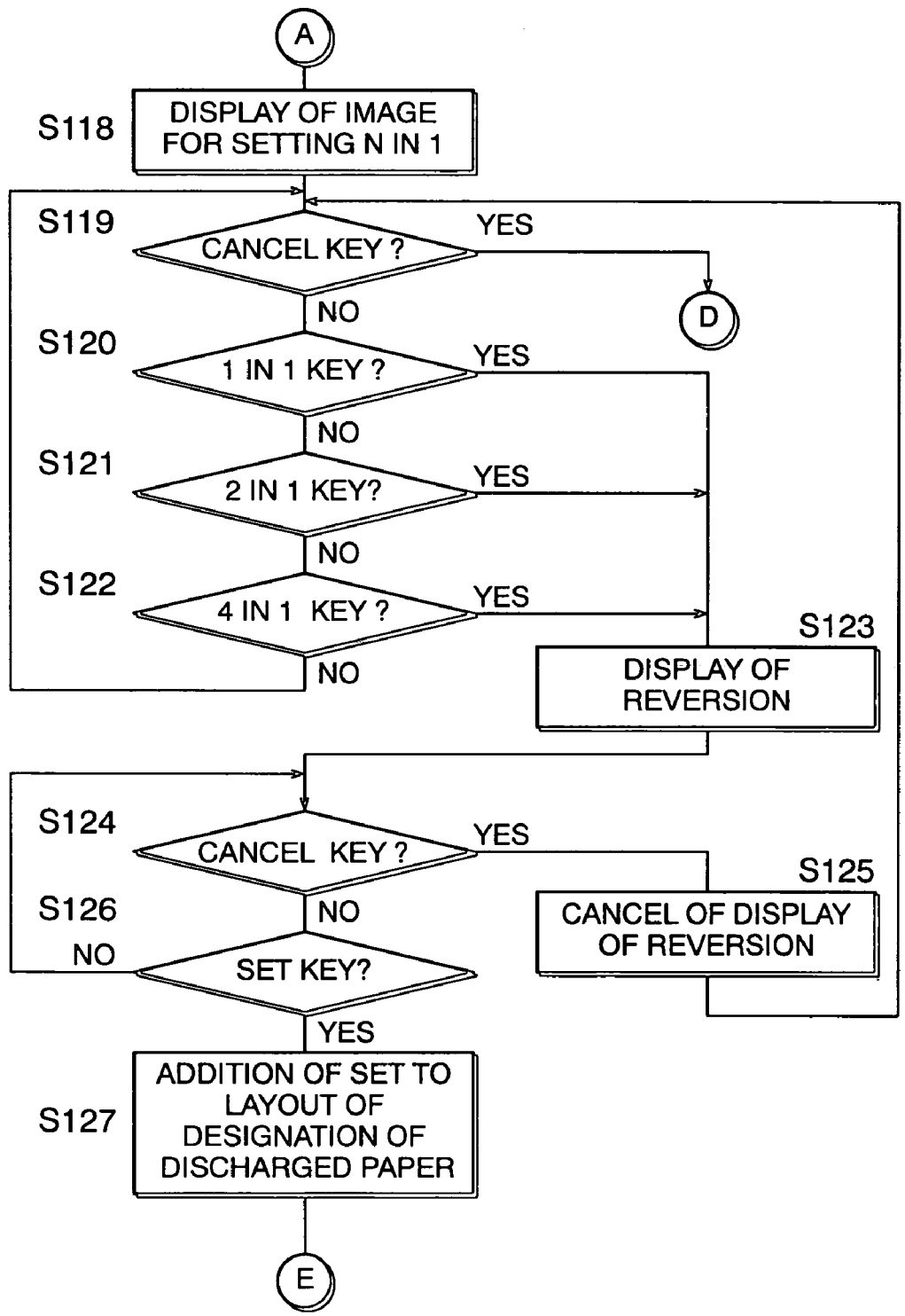
FIG. 5 is a flow chart continuing from FIG. 4.
Figure 6:
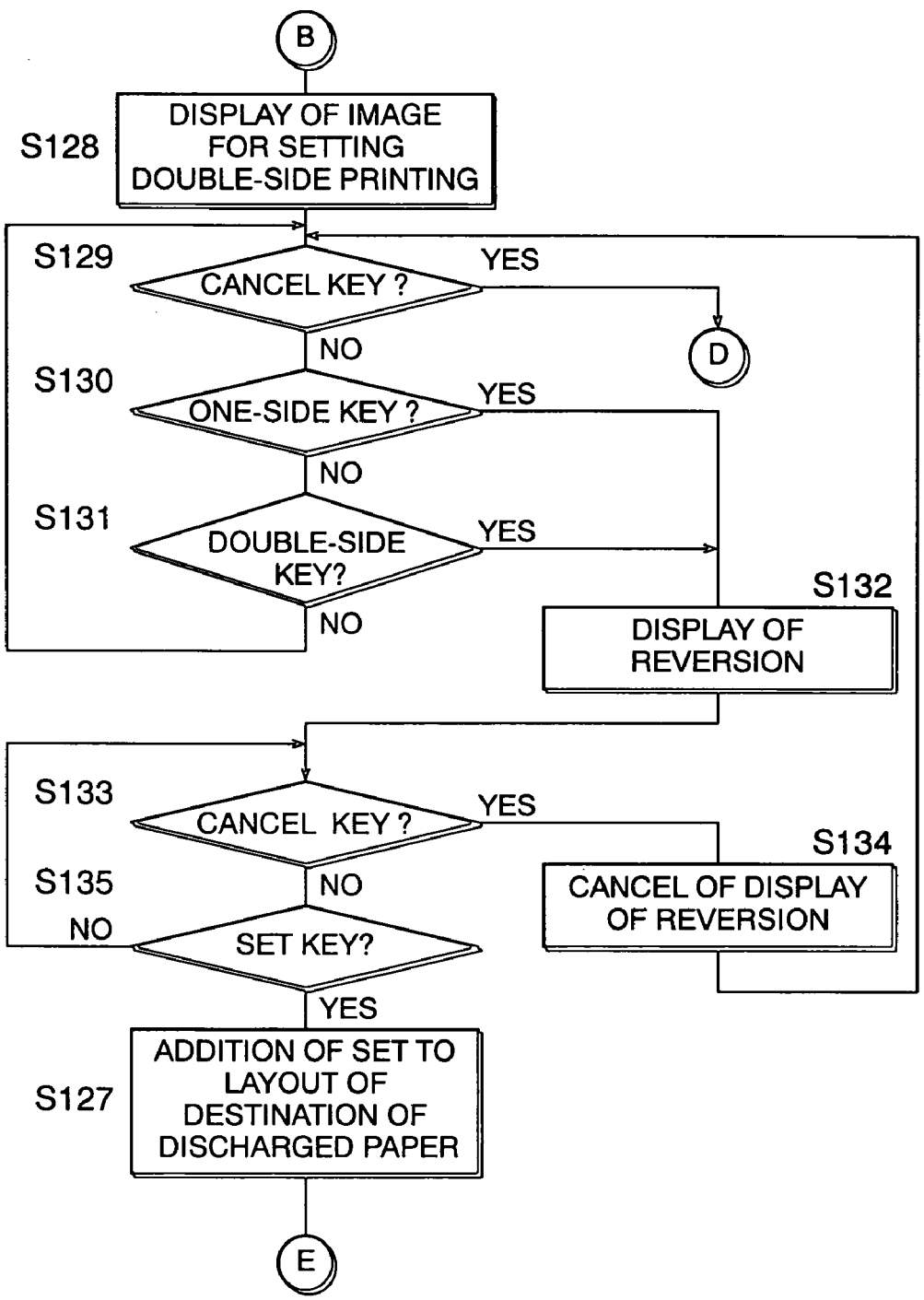
FIG. 6 is a flow chart continuing from FIG. 4.
Figure 7:
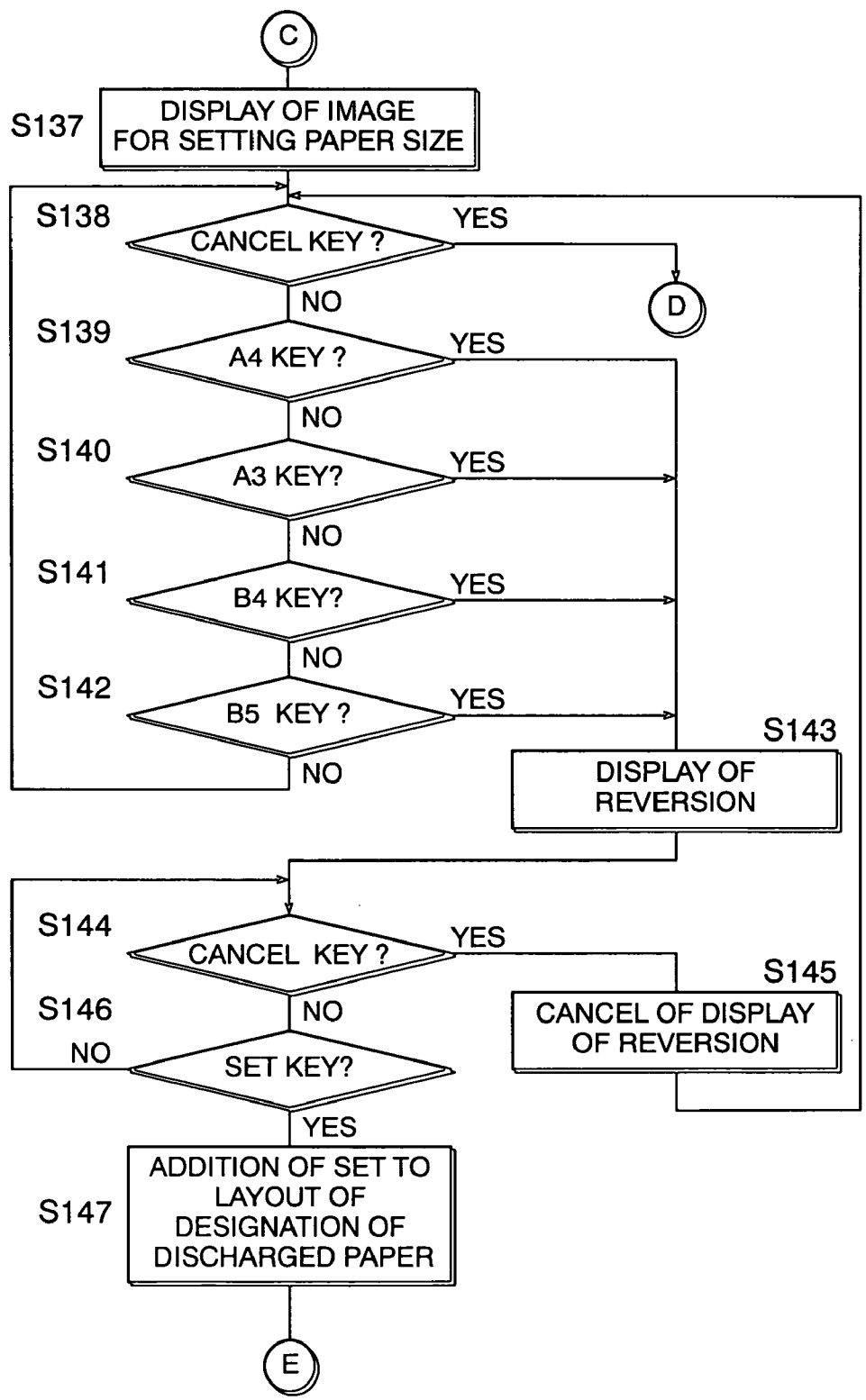
FIG. 7 is a flow chart continuing from FIG. 4.

Refer to FIG. 3, this system is so configured for allowing an image formed by an external personal computer 3 to be printed out into a mail bin (discharged paper tray 11) designated by the printer 1. The printer 1 comprises the operating display 13, an image processing part 14, a RAM 15, a ROM 16, a finisher 17, a finisher controller 18, an interface 19 and a CPU 20.

The image processing part 14 performs enlargement, contraction, Nin1, double-side printing and other image treatments of an image to be printed out. The RAM 15 stores temporarily the image data transferred from the personal computer 3. The ROM 16 memorizes various processing programs. The finisher 17 performs such post handling as stapling, perforation, and folding on printed papers. The finisher controller 18 controls the operation of the finisher 17. The interface 19 transfers data to and from the personal computer 3. The CPU 20 effects comprehensively control of the component parts mentioned above. These parts excepting the finisher 17 are mutually connected by an internal bus 21. The personal computer 3 is provided with an interface 31 for transferring data to and from the printer 1.

As the finisher 17 may be a so-called optional device, this invention may be embodied in the printer without the finisher 17. An embodiment of FIG. 3 is illustrated that has one printer 1 connected to one personal computer 3, but this invention can be embodied in the embodiment having one or more printers 1 connected to a plurality of personal computers 3.

In this printer 1, the layout setting at a printout is performed for each of the destinations (mail bins) of printed papers. It does not set by the user for each print job. The output form (double-side printing, Nin1, etc.) of an image for the discharged papers, the size of paper of the discharged prints, and the post handling (stapling, perforation, folding, etc.) to be performed on the printed discharged papers may be automatically unified for each of the mail bins.

Refer to FIG. 4–FIG. 7, the user's layout setting is carried out on the operating display 13.

When the power source of the printer 1 is turned on, the printer 1 is initially set at a state of communicating with the personal computer 3 (on-line). When the on-line key 131 is depressed only one time (S101: YES), the off-line processing (S102) for cutting the connection of the printer 1 with the personal computer 3 is carried out. And the printer 1 is watched in the off-line state till the on-line key 131 is subsequently depressed (S103: YES). At this time, the indicator 131a is put on when the printer 1 is in the on-line state or put out when the printer 1 is in the off-line state.

Figure 8:
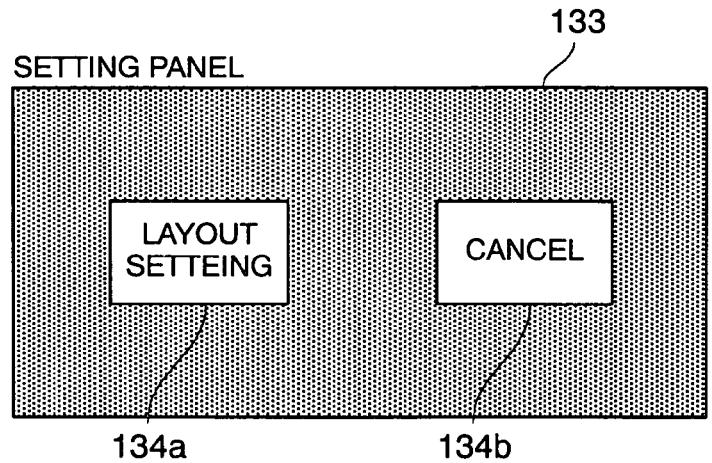
FIG. 8 is a plan view illustrating a "setting panel" of the operating display shown in FIG. 2.

When the printer 1 is in the on-line state (S101: NO), if the setting key 132 is depressed (S104: YES), the display 133 puts up a prescribed "setting panel" (S105), as shown FIG. 8.

Figure 9:
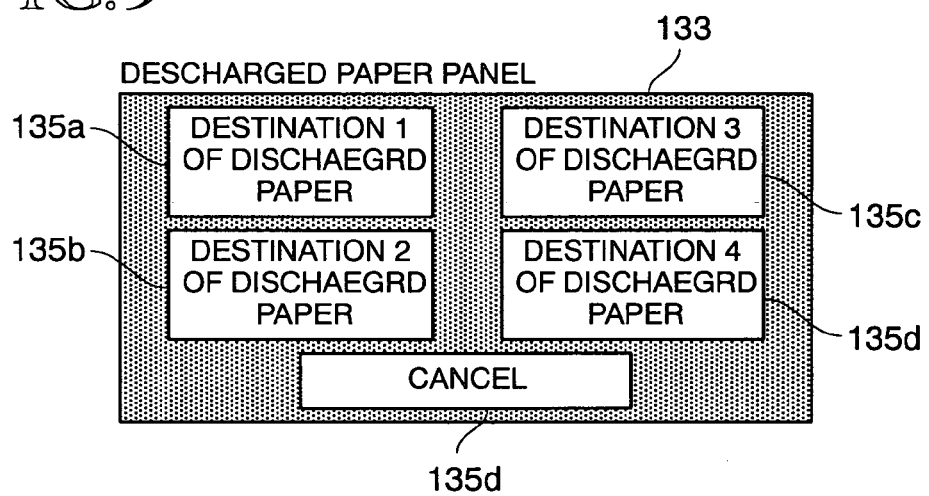
FIG. 9 is a plan view illustrating a "panel of designating destinations of discharged papers" of the operating display shown in FIG. 2.

In this "setting panel", when a cancel key 134b is depressed (S106: YES), the processing immediately returns to the step S101 and the printer 1 is returned to its initial state. When a layout setting key 134a is depressed (S107: YES), the display 133 is shifted to the subsequent prescribed "panel of designating destinations of discharged papers" (discharged paper panel) (S108), as shown FIG. 9.

Figure 10:
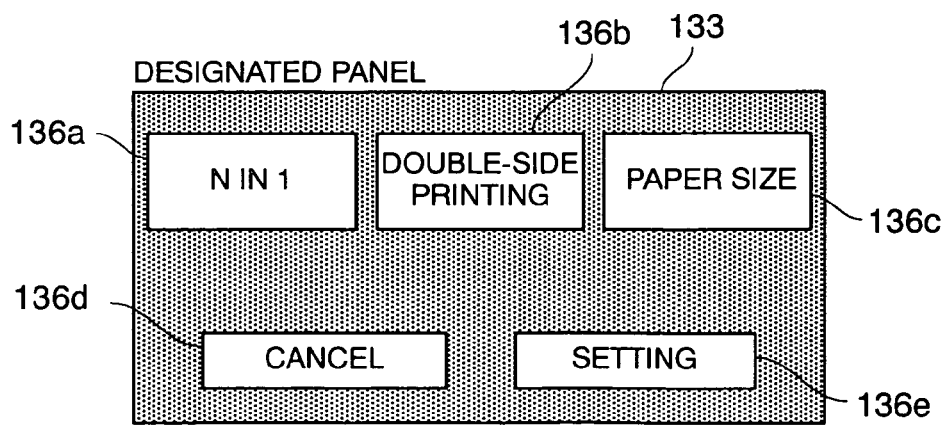
FIG. 10 is a plan view illustrating a "panel of set designation" of the operating display shown in FIG. 2.

Subsequently, in this "discharged paper panel", when a cancel key 135d is depressed (S109: YES), the processing returns immediately to the step S105 and the display 133 is returned to the "setting panel" one frame back. When any one of paper discharge destination keys 135a, 135b, 135c, and 135d is depressed (S110: YES), the destination of the discharged paper corresponding to the depressed key is designated by means of CPU 20 (S111). And the display 133 switches the panel thereof to the next prescribed "panel of set designation"(designated panel) (S112), as shown FIG. 10. Namely, when the user depresses one of the keys 135a–135d corresponding to the particular destination of discharged paper which the user wishes to effect the layout setting, the destination is designated at the address corresponding to the depressed key. Concretely, when the discharged paper destination 1 key 135a is depressed, the destination of discharge paper is designated at "1". When the discharged paper destination 2 key 135b is depressed, the destination of discharge paper is designated at "2". When the discharged paper destination 3 key 135c is depressed, the destination of discharge paper is designated at "3". When the discharged paper destination 4 key 135d is depressed, the destination of discharge paper is designated at "4".

Subsequently, the user depresses the key corresponding to the setting to be effected on this "designated panel".

Concretely, in this "designated panel", when a cancel key 136d is depressed (S113: YES), the processing is immediately returned to the step S108 and the display 133 is returned to the "discharged panel". When a setting key 136e is depressed (S114: YES), the processing returns immediately to the step S101 and the printer 1 returns to the initial state in preparation for setting the next layout. When a Nin1 key 136a is depressed (S115: YES), the processing is shifted to the procedure of processing shown in the flow chart of FIG. 5. When a double-side printing key 136b is depressed (S116: YES), the processing shifts to the procedure of processing shown in the flow chart of FIG. 6. When a paper size key 136c is depressed (S117: YES), the processing shifts to the procedure of processing shown in the flow chart of FIG. 7.

Next, it is described in operation corresponding to each mode of "designated panel".

Figure 11:
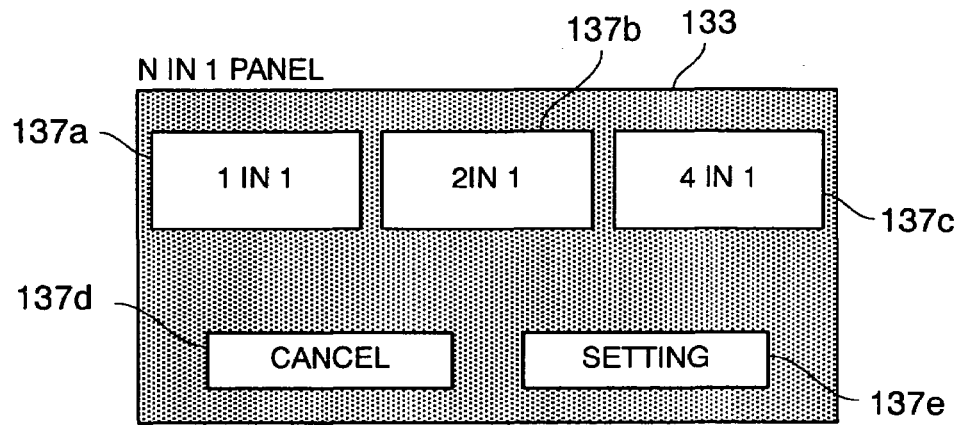
FIG. 11 is a plan view illustrating a "panel of setting Nin1" of the operating display shown in FIG. 2.

First, when the Nin1 key 136a is depressed on the "designated panel" (S115: YES), the processing shifts to the flow chart of FIG. 5 and the display 133 switches the screen thereof to the next prescribed "panel of setting Nin1" (Nin1 panel), as shown FIG. 11 (S118).

Then, the user depresses the key corresponding to the necessary layout on this "Nin1 panel". Concretely, when a cancel key 137*d* is depressed in this "Nin1 panel" (S119: YES), the processing immediately returns to the step S112 and the display 133 returns to the "designated panel" one frame back. When a 1in1 key 137*a* is depressed (S120: YES), the display 133 effects reversion and puts up the selected 1in1 key 137*a* (S123). When a 2in1 key 137*b* is depressed (S121: YES), the display 133 effects reversion and puts up the selected 2in1 key 137*b* (S123). When a 4in1 key 137*c* is depressed (S122: YES), the display 133 effects reversion and puts up the selected 4in1 key 137*c* (S123). By effecting reversion and putting up the selected keys 137*a*–137*c*, the display 133 notifies the user of the completion of the selection.

When the cancel key 137*d* is depressed while the Nin1 keys 137*a*–137*c* remain in the state displaying reversion (S124: YES), the display 133 cancels the display of reversion (S125) and returns to the step S119.

While the Nin1 keys 137*a*–137*c* remain in the state displaying reversion, when the cancel key 137*d* is not depressed (S124: NO) and a setting key 13*e* is depressed (S126: YES), the layout setting designated at the steps S120–S122 is added to or made to supersede the destination of discharged paper selected formerly in the "discharged paper panel" (S127). And then, the display 133 subsequently returns to the "discharged paper panel" of the step S108.

Figure 12:
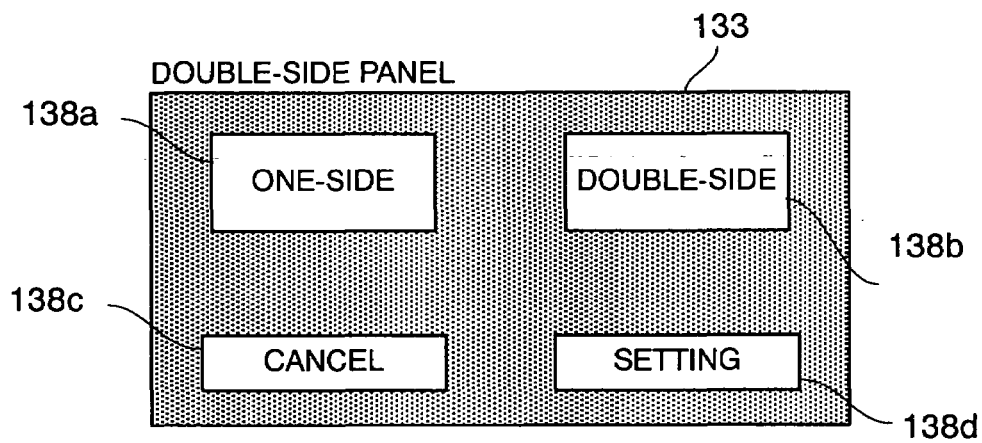
FIG. 12 is a plan view illustrating a "panel of setting double-side printing" of the operating display shown in FIG. 2.

When the double-side printing key 136*b* is depressed on the "designated panel" (S116: YES), the processing shifts to the flow chart of FIG. 6. The display 133 shifts to the panel of the subsequently prescribed "double-side panel", as shown FIG. 12 (S128).

Subsequently, the user depresses the key corresponding to the layout expected in the "double-side panel". Specifically, when a cancel key 138*c* is depressed in this "double-side panel" (S129: YES), the processing immediately returns to the step S112 and the display 133 returns to the "designated panel" one frame back. When a one-side key 138*a* is depressed (S130: YES), the display 133 effects inversion and puts up the selected one-side key 138*a* (S132). When a double-side key 138*b* is depressed (S131: YES), the display 133 effects inversion and puts up the selected double-side key 138*b* (S132). By effecting inversion and putting up the selected key 138*a* or 138*b*, the display 133 notifies the user of the completion of the selection.

When the cancel key 138*c* is depressed while the one-side key 138*a* or the double-side key 138*b* remains in the state displaying the inversion (S133: YES), the display 133 cancels the display of inversion (S134) and returns to the step S129.

When the cancel key 138*c* is not depressed (S133: NO) and the setting key 138*d* is depressed (S135: YES) while the one-side key 138*a* or the double-side key 138*b* remains in the state displaying the inversion, the layout setting designated at the step S130 or the step S131 is added to or made to supersede the destination of discharged paper selected formerly in the "discharged paper panel" (S136). Then, the display 133 returns to the "discharged paper panel" at the step S108.

Figure 13:
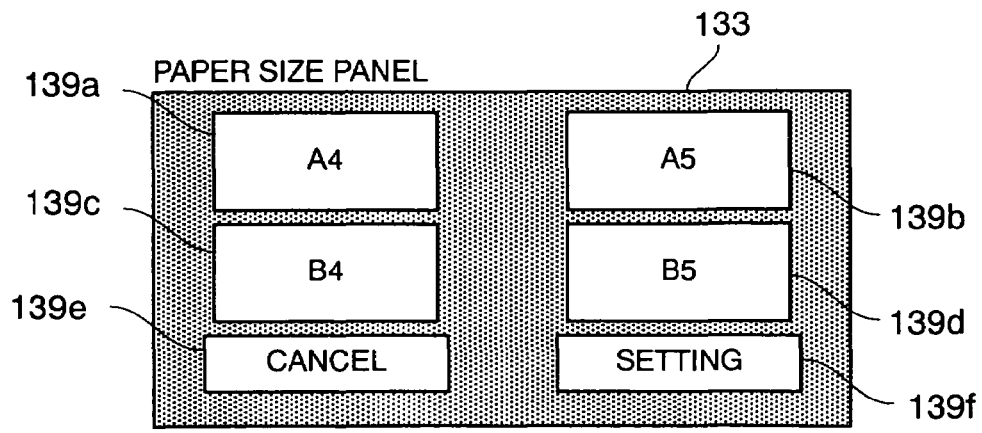
FIG. 13 is a plan view illustrating a "panel of setting paper size" of the operating display shown in FIG. 2.

When the paper size key 136*c* is depressed in the "designated panel" (S115: YES), the processing returns to the flow chart of FIG. 7 and the display 133 switches the panel to the next prescribed "panel for setting paper size" (paper size panel), as shown FIG. 13 (S137).

Subsequently, the user depresses the key corresponding to the layout expected in the "paper size panel". Specifically, when a cancel key-139*e* is depressed in this "paper size panel" (S138: YES), the processing immediately returns to the step S112 and the display 133 returned to the "designated panel" one frame back. When A4 key 139*a* on the panel is depressed (S139: YES), the display 133 effects inversion and puts up the selected A4 key 139*a*. When A3 key 139*b* is depressed (S140: YES), the display 133 effects inversion and puts up the selected A3 key 139*b* (S143). When B4 key 139*c* is depressed (S141: YES), the display 133 effects inversion and puts up the selected B4 key 139*c*. When B5 key 139*d* is depressed (S142: YES), the display 133 effects inversion and puts up the selected B5 key 139*d* (S143). By effecting the inversion and putting up the selected keys 139*a*–139*d*, the display 133 notifies the user of the completion of the selection.

When the cancel key 139*e* is depressed while the paper size keys 139*a*–139*d* remain in the state displaying the inversion (S144: YES), the display 133 cancels the display of the inversion (S145) and returns to the step S138.

When the cancel key 139*e* is not depressed (S144: NO) and a setting key 139*f* is depressed (S146: YES), while the paper size keys 139*a*–139*d* remain in the state displaying the inversion, the layout setting designated at the steps S139–S142 is added to or made to supersede the destination of discharged paper selected formerly in the "designated paper panel" (S147). Subsequently, the display 133 returned to the "designated paper panel" of the step S108.

Thus, the layouts of Nin1, double-side printing, and paper size are set for each of the destinations of discharged paper (main bins).

When the user is about to induce transfer of an image from the personal computer 3 to the printer 1, what processing the user ought to resort to for the purpose of arranging in order the layout for each of the destinations of discharged papers will be described below.

The user prepares in the personal computer 3 an image to be produced. And, the user, for example, fixes the destination (mail bin) for the image to be produced, decides the form of printing such as Nin1 or double-side printing, and designates the size of paper to be used for printing with the aid of a printer driver. After these settings have been completed, if the printer is requested to produce prints, the personal computer 3 converts the designation of the destination of discharged printed paper, the setting of Nin1, the setting of double-side printing, the setting of paper size etc. into data as headers of a form comprehensible to the printer 1 and further converts images into image data. Subsequently, the headers and the image data are transmitted as print data of one job from the personal computer 3 to the printer 1 via respective interfaces 31 and 19.

Figure 14:
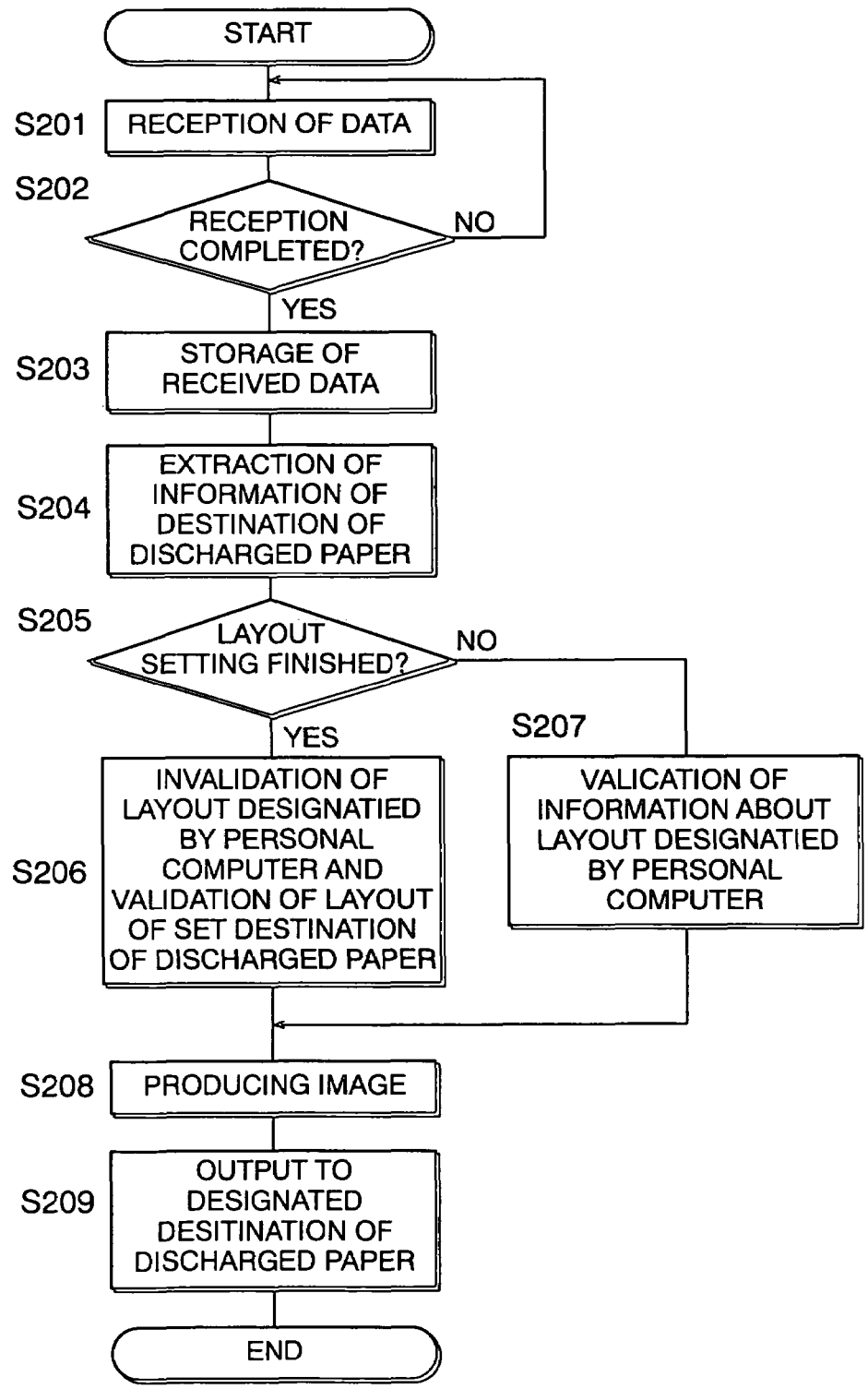
FIG. 14 is a flow chart illustrating the operation of the printer in response to reception of one job of print data.

The flow of processing which occurs in the printer 1 after the printer 1 has received the headers and the image data as print data of one job from the personal computer 3 is shown in FIG. 14.

The printer 1 receives one header and not less than one image data as print data of one job via the interface 19 from the personal computer 3 (S201). It stores temporarily the received data in the RAM 15 when the reception has been completed (S202: YES). One example of the configuration of data of the image data area in the RAM 15 thus storing the received data is shown in FIG. 15A. One example of the table of data set as sorted by destinations of discharged paper in the RAM 15 memorizing the data for setting a layout for each destination of discharged paper is shown in FIG. 15B. This data table is that is memorized the results of the layout setting (FIG. 4–FIG. 7).

When the receiving data has been stored in the prescribed area of the RAM 15, the CPU 20 reads the header in the stored data. And the CPU 20 extracts the information on the destinations of discharged papers (designated mail bins) written in the header (S204). And then, the CPU 20 judges whether or not the designated destinations of discharged paper have already been set for layout by consulting the table of data set as sorted by destinations of discharged paper, as shown FIG. 15B (S205).

Figure 15:
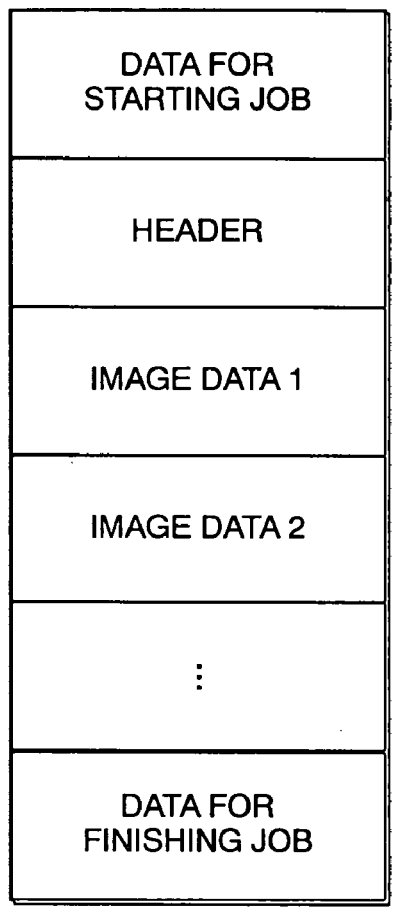
FIG. 15 is a diagram illustrating one example of the data configuration in the RAM.

As a result, if the designated destinations of discharged paper have been set for layout (S205: YES), the header already stored in the RAM 15 is canceled at the step S203. Namely, the CPU 20 invalidates the information of layout designated by the personal computer 3, and at the same time, validates the information of layout stored in the data table of set as sorted by destinations of discharged paper. This information of layout is that is already set with respect to the destinations of discharged paper. And the CPU 20 writes the information of layout as headers in the image data area in the RAM 15 (S206). In FIG. 15, the arrow P depicts an example of writing the layout setting data i.e. layout information of the destination 1 of discharged paper as a header into the image data area of the RAM 15. If the designated destination of discharged paper has not been set for layout (S205: NO), the header stored in the RAM 15 at the step S203 is validated, namely the layout information designated by the personal computer 3 is validated (S207).

Subsequently, the CPU 20 transfers the header and the image data written in the image data area of the RAM 15 to the image processing part 14. And the image processing part 14 processes the image data in accordance with the available layout information (such as Nin1, double-side printing, and paper size) written in the header and outputs an image to be emitted (S208). The produced image is printed on the papers and the printed papers are emitted to the destinations of discharged paper designated by the personal computer 3 (S209). The emission of the printed papers to the designated destinations of discharged paper is effected through the medium of a finisher 17, with necessary data transferred to a finisher controller 18. When post handling i.e. stapling, perforation, and folding etc. has been set with respect to the destinations of discharged paper in this case, the printed papers are discharged into designated discharged paper trays 11 after the set post handling have been performed by the finisher 17.

When the printed papers are discharged to the destinations of discharged paper which have undergone layout setting as described above, all the prints are produced in a unified layout.

In accordance with this embodiment, since the layouts of the printed papers discharged into the mail bins are unified, the users of the mail bins are thereafter enabled to attain orderly arrangement and management of documents with ease.

Second Embodiment

This embodiment assumes as a premise the use of the printer 1 according to the first embodiment, namely the printer 1 which is provided with paper discharge openings allowing outlet layouts to be set for each of the destinations of discharged papers, and aims at improving this printer 1. By storing in the memory the image data already edited in the layout to be discharged when the supply of papers to be used for printing has run out, the present embodiment promotes effective use of the memory and reduction in the time of output (referred to hereinafter as "printer 1*a*"). In the following description, FIG. 1–FIG. 15 are suitably referred to.

The ordinary printer receives the print data embracing image data and the layout information thereof, processes the image data in conformity with the layout information, and effect printing. It must be loaded with a memory of large volume for the purpose of enabling the image data to be preserved intact in the memory (RAM) till the papers fit for the discharge are replenished after the supply thereof has run out. Further, it consumes much time for the discharge because the image data needs to be edited again after the papers have been replenished.

The present embodiment, therefore, is stored in the memory the image data which has-been edited in the layout to be discharged when the supply of papers for producing prints runs out.

Figure 16:
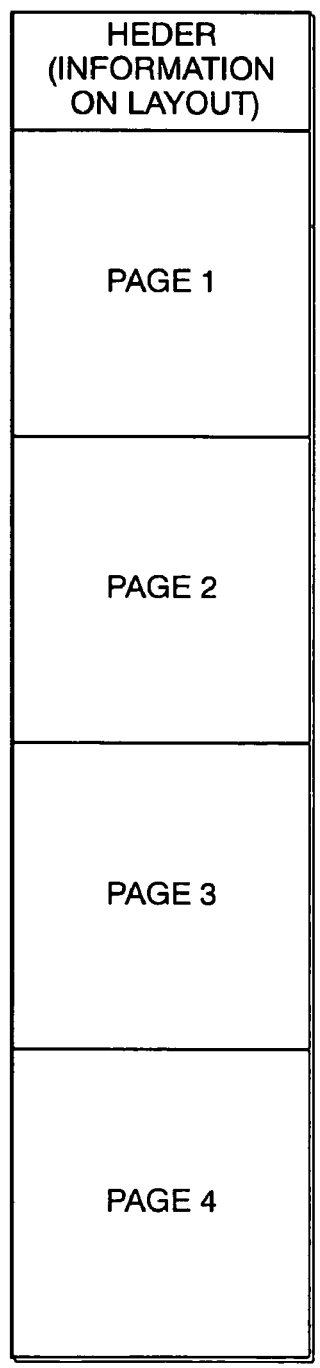
FIG. 16 is a schematic view showing the amount of memory required for printing 4 pages of A4 papers in the 4in1 format on A4 papers.
Figure 16:
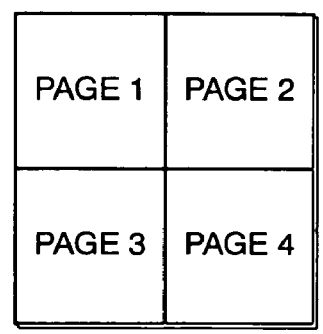

Refer to FIG. 16, when the user produces A4: 4-page document with the personal computer 3, and prints this document in the 4in1 mode on A4 papers, and then discharges the printed papers to the designated destinations, the printer in the absence of papers fit for the printing retain the image data till the supply of the fit papers is replenished.

The ordinary printer, for the purpose of preserving the received data intact, stands in need of a memory capacity of 16 MB+. for storing four A4 size 600 dpi pages of image data each of about 4 MB (namely 16 MB) and the header containing layout information (. MB) (FIG. 16A).

In contrast, the present embodiment can preserve the edited image data with a memory for storing one A4 page of about 4 MB and obviates the necessity for a memory area for the header (FIG. 16B). Further, the image data to be produced is in an already edited form and the output time after the replenishment of papers can be reduced.

Figure 17:
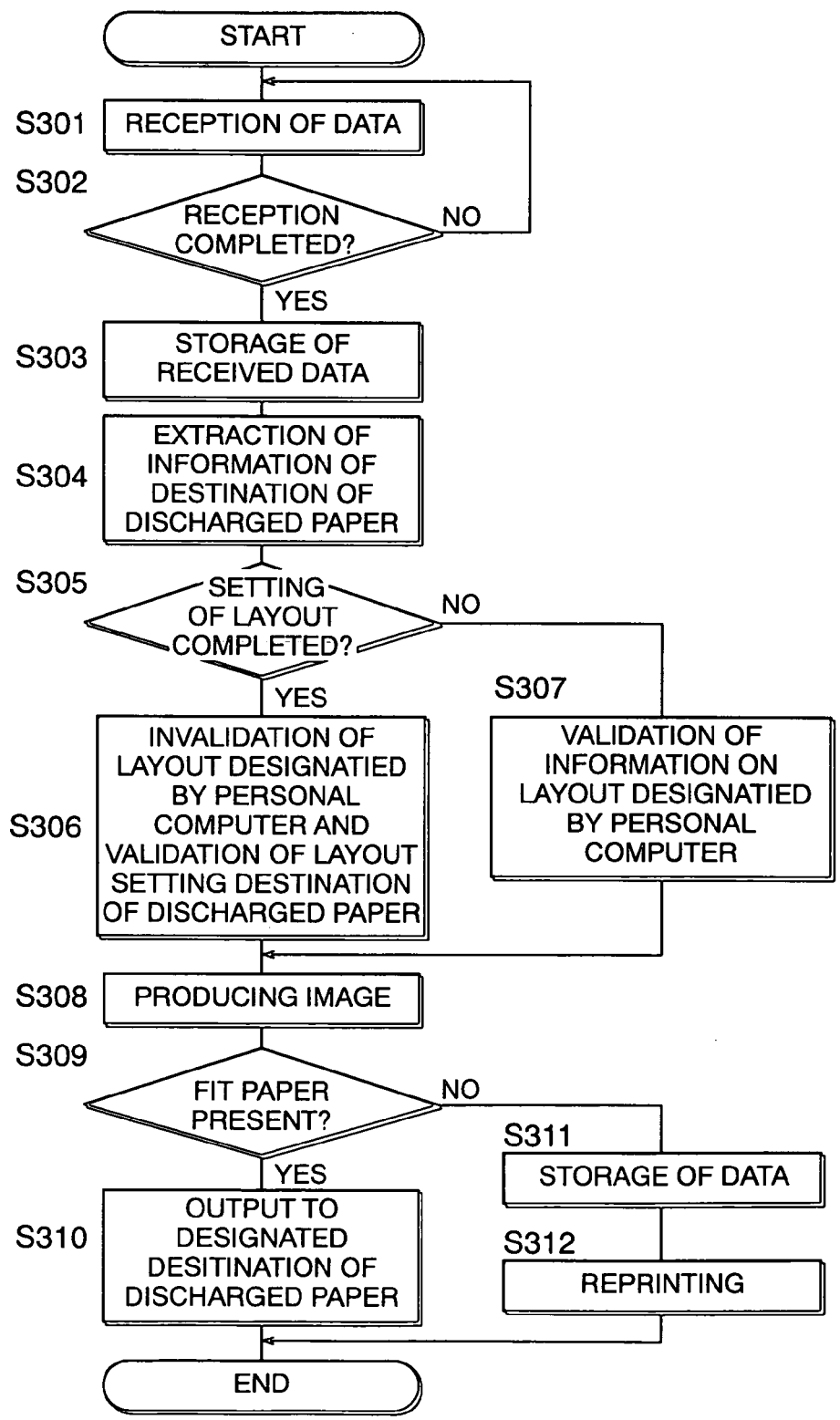
FIG. 17 is a flow chart illustrating the operation of a modified version of the printer.

Incidentally, since the processing from the step S301 through the step S308 of FIG. 17 is identical with the processing from the step S201 through the step S208 of FIG. 14, it will be omitted from the following description.

When an edited image is produced at the step S308, the CPU 20 judges whether or not designated fit papers are present in at least one of the paper discharge openings (S309). If the presence of fit papers is confirmed (S309: YES), the image is printed on the papers and the printed papers are discharged to the destinations of discharged paper designated by the personal computer 3 (S310). If the absence of fit papers is confirmed (S309: NO), the image data is temporarily stored (S311). And the image data is reprinted on the fit papers after the supply of papers has been replenished (S312).

Figure 18:
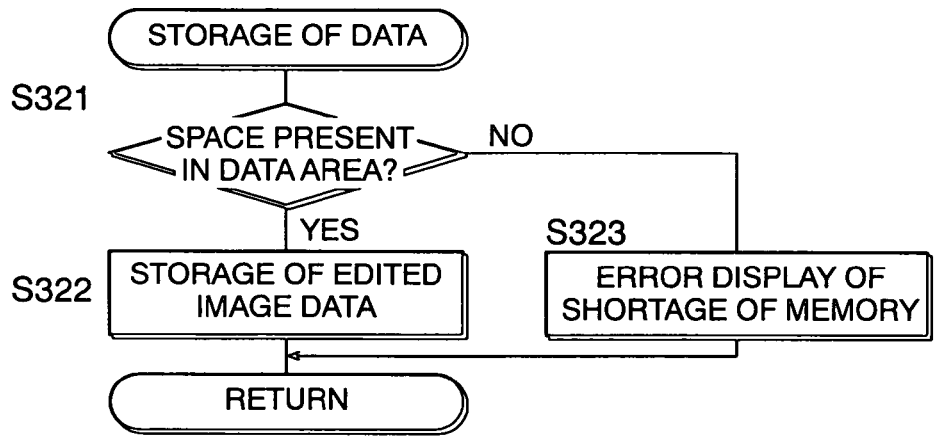
FIG. 18 is a flow chart illustrating the sub-routine for the processing of the data storage shown in FIG. 17.

Refer to FIG. 18, when the image data is stored in the memory (RAM 15) (S311), examines the data area of the memory (RAM 15) to determine whether or not it has a vacancy. If the data area is found to have a vacancy (S321: YES), the edited image data is stored in that area (S322). If the data area is found to have no vacancy, the display indicates that the capacity of the memory is insufficiency (S323).

The ordinary printer requires to store the information on edition i.e. layout information and the image data separately of each other (S4232, S423) and, moreover, stands in need of information for associating the image data and the information on edition.

By storing the edited image data as in the case of the present embodiment, therefore, the memory (RAM 15) can be used effectively when the image data is to be preserved in the main body of the printer.

Figure 19:
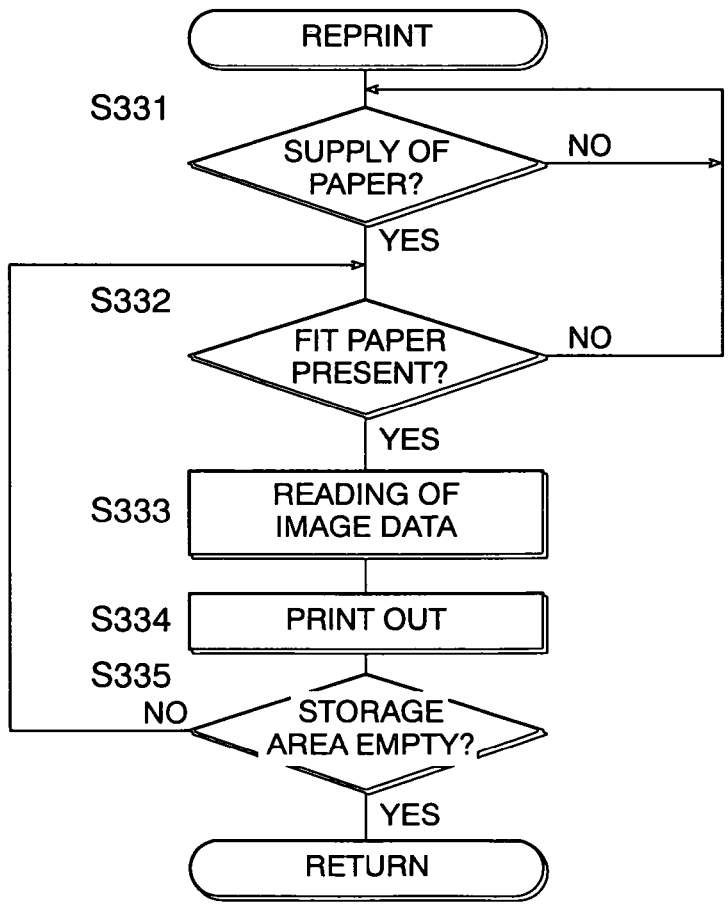
FIG. 19 is a flow chart illustrating the sub-routine for the processing of reprinting shown in FIG. 17.
Figure 20:
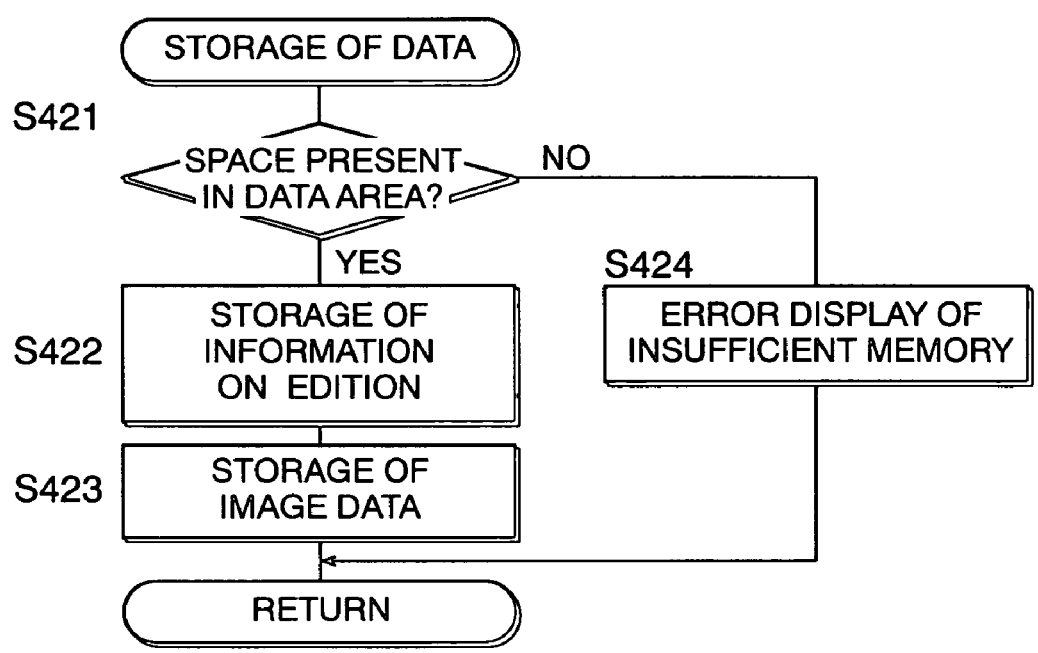
FIG. 20 is a flow chart illustrating the conventional processing for data storage.
Figure 21:
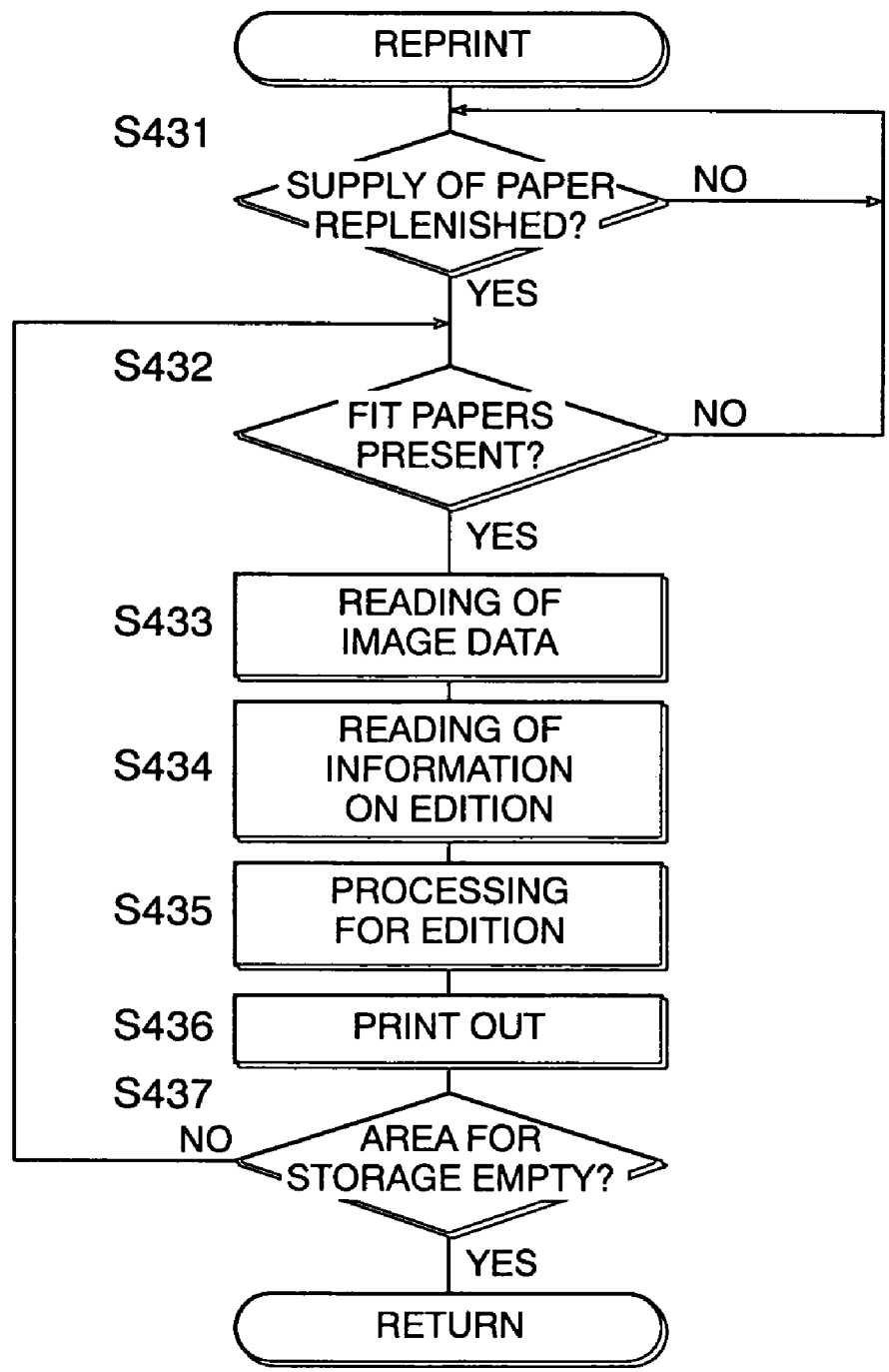
FIG. 21 is a flow chart illustrating the conventional processing for reprinting.

Refer to FIG. 19, when the printer is required to reprint (S313), examines itself to confirm that the supply of papers has been replenished (S331: YES) and that the fit papers are present (S332: YES). And then, the printer reads the temporarily stored edited image data from the memory (RAM 15) (S333), prints the image data on the fit papers, and discharges the printed papers to the destinations of discharged paper designated by the personal computer 3 (S334). This procedure is repeated till the area storing the edited image data is emptied, namely till all the image data of one job to be printed has been printed out (S335: YES).

The ordinary printer causes the image data and the information on edition i.e. layout information temporarily stored in the memory to be read out separately of each other from the memory (S433 and S434). And the ordinary printer processes the image data in conformity to the information on edition (S435), and then discharges the printed papers to the designated destinations of discharged paper (S436).

By storing the edited image data as in the case of this embodiment, therefore, the time for output can be reduced because the processing for edition is not required during the course of output after the supply of papers has been replenished.

While the first and second embodiments adopt the mode of causing the image data received from the personal computer to be printed with a printer, the present invention can be embodied in a copying machine which comprises a scanner and a printer. In this case, the form of output is set in advance by designating trays with the aid of the operating panel. In the case of the copying operation, by simply designating the destinations of discharge (trays), the copying is carried out in the form of output using the designated trays. The user's burden on the copying operation, therefore, can be reduced to the extent of designating trays and setting the number of copies to be produced.

What is claimed is:

1. An image forming apparatus comprising:
   a plurality of trays which receive discharged sheets;
   an operator interface which selectively sets a size of sheets with respect to at least one of said plurality of trays;
   a tray selector which selects one of the plurality of trays as a discharged destination;
   an image forming unit which forms an image on a sheet of a size set by the operator interface with respect to the selected tray; and
   an interface which receives print data transmitted from an external device, said print data including image data, tray selection information and size information, and a controller which invalidates the size information in the print data and makes the image forming unit form an image on a sheet of the size set by the operator interface with respect to the selected tray based on the tray selection information.

2. An image forming apparatus according to claim 1, wherein the size of sheets is capable of being set with respect to the each of the plurality of trays.

3. An image forming apparatus according to claim 1, wherein the plurality of trays are used as a mail-bin.

4. An image forming apparatus according to claim 1, further comprises an interface which receives print data transmitted from an external device, said print data including image data, tray selection information and size information, and a controller which makes the image forming unit form an image on a sheet of the size based on the size information in the print data if size information with respect to a selected tray based on the tray selection information is not set by the operator interface.

5. An image forming apparatus which discharges printed sheets with respect to each of a plurality of destinations, said image forming apparatus comprising:
   a memory which stores layout information of printed sheets, said layout information being capable of being stored with respect to the each of the plurality of destinations and indicating an output format of the printed sheets;
   an image forming unit which forms an image on a sheet;
   an interface which receives print data transmitted from an external device, said print data including image data, destination information and layout information; and
   a controller which invalidates the layout information in the print data and makes the image forming unit form an image on a sheet based on the layout information stored in the memory with respect to a destination which is designated by the destination information in the print data.

6. An image forming apparatus according to claim 5, wherein the layout information stored in the memory is set by an operator interface on the image forming apparatus.

7. An image forming apparatus according to claim 5, wherein the image forming apparatus has a plurality of trays which receive discharged sheets, said each of the plurality of trays being corresponded to one of the destinations.

8. An image forming apparatus according to claim 7, further comprises a tray selector which selects one of the plurality of trays as a discharged tray.

9. An image forming apparatus according to claim 7, wherein the plurality of trays are used as a mail-bin.

10. An image forming apparatus according to claim 5, wherein the image forming apparatus is a printer and the external device is a computer connected to the printer.

11. An image forming apparatus according to claim 5, wherein the layout information is at least one of N-in-1 processing, double-side printing, paper size setting, margin setting, stapling, perforation, folding, sorting, water marking, printing of serial numbers, impression of printing time, enlargement or contraction.

12. An image forming apparatus which discharges printed sheets with respect to each of a plurality of destinations, said image forming apparatus comprising:
   a memory which stores layout information of printed sheets, said layout information being capable of being stored with respect to the each of the plurality of destinations and indicating an output format of the printed sheets;
   an image forming unit which forms an image on a sheet;
   an interface which receives print data transmitted from an external device, said print data including image data, destination information and layout information; and
   a controller which makes the image forming unit form an image on a sheet based on the layout information in the print data if the memory has no layout information with respect to a destination which is designated by the destination information in the print data.

13. An image forming apparatus according to claim 12, wherein the layout information stored in the memory is set by an operator interface on the image forming apparatus.

14. An image forming apparatus according to claim 12, wherein the image forming apparatus has a plurality of trays which receive discharged sheets, said each of the plurality of trays being corresponded to one of the destinations.

15. An image forming apparatus according to claim 14, further comprises a tray selector which selects one of the plurality of trays as a discharged tray.

16. An image forming apparatus according to claim 14, wherein the plurality of trays are used as a mail-bin.

17. An image forming apparatus according to claim 12, wherein the image forming apparatus is a printer and the external device is a computer connected to the printer.

18. An image forming apparatus according to claim 12, wherein the layout information is at least one of N-in-i processing, double-side printing, paper size setting, margin setting, stapling, perforation, folding, sorting, water marking, printing of serial numbers, impression of printing time, enlargement or contraction.

* * * * *